3,352,792
ODOR INHIBITING COMPOSITION
John B. Clark, Whiting, Ind., and Hulda Clark, Whiting, Ind. (325 N. Clark St., Bloomington, Ind. 47401); said John B. Clark assignor to said Hulda Clark
No Drawing. Filed July 6, 1964, Ser. No. 380,645
1 Claim. (Cl. 252—193)

The present invention relates generally to deodorizers and more particularly to a powder composition to be used with animal litter and the like for the deodorization thereof.

Commercial animal litter is generally comprised of fritted clay. It is normally used by spreading a quantity thereof to thickly cover the bottom of a shallow container and serves to absorb the uric and fecal waste eliminated by household pets such as cats and dogs. Within a short period of time, offensive odors are produced and the used litter must be replaced with new litter in order to maintain an odor-free and sanitary litter box. If commercial litter is used, frequent replacement of the litter is expensive and if non-commercial litter is used, such as sand, ground clay, saw dust or woodchips, frequent replacement of the litter is at least laborious and troublesome. If the litter is not changed when necessary, the litter box may be sufficiently odorous to deter an animal such as a cat from using the litter box and cause it to seek other places to perform its waste eliminating function and thereby weakening desirable sanitary habits.

The use of litter material to absorb animal waste is, of course, not limited to household pets, but may be used wherever animals are confined. The odor emanating from used litter results mainly from the formation of ammonia produced by the decomposition of urea excreted by the animal, and for certain animals such as young pigs, the ammonia fumes of an odorous litter may predispose the young pigs to pneumonia and to other respiratory illnesses.

Accordingly, the object of the present invention is to eliminate the above disadvantages of the prior practice by providing an additive deodorizing compound for litter material.

Another object of the present invention is to provide an additive compound for litter material which will maintain the litter deodorized for a long period of time.

Still another object of the present invention is to provide an additive compound for litter which is easy and economical to manufacture and to use.

The enzyme urease is present in the alkaline fermentation of urine, produced by bacteria. The chief constituent of uric waste is urea, the hydrolysis of which is induced by the enzyme urease forming ammonia gases which causes the unpleasant odor associated with uric animal waste. Effective deodorization of the absorbent of such uric animal waste may be obtained by preventing the acceleration of the hydrolysis of the urea by controlling the reaction of the urease and the urea.

We have found that by mixing with the litter absorbent, a composition of a borate such as borax, $Na_2B_4O_7(H_2O)$, and magnesium carbonate, $MgCO_3$, no odor develops when the prepared litter absorbs the uric waste discharged by the animal. Experiments have disclosed that the borate ingredient is the deodorizing component. The use of borate alone effects deodorization, however, not as completely nor as prolonged as when magnesium carbonate is included as an integrant of the composition. The magnesium carbonate in combination with the borate provides an unexplained intensifying action making the deodorizing action of the borate more complete and for a protracted period of time than when the borate is the sole ingredient.

As an example of our invention, a most effective deodorizing compound for animal litter comprises a homogeneous mixture of approximately $1/20$ of one part by weight of magnesium carbonate with 100 parts by weight of borax.

We have also found that by adding to the above mixture a trace of iron in the form of iron oxide, that the urease inhibition of the mixture is enhanced.

It will be understood that the foregoing examples have been given for illustrative purposes and that this invention is not limited to the details of the description since various modifications may be made in the particular composition, proportions and the application of the present invention without departing from the spirit and scope of the following claim.

What we claim is:

A deodorant for animal litter consisting essentially of a homogeneous mixture of approximately $1/20$ of one part by weight of magnesium carbonate and 100 parts by weight of borax.

References Cited

FOREIGN PATENTS
379,010    8/1907    France.

OTHER REFERENCES

The Condensed Chemical Dictionary—Rose, Reinhold Publ. Corp., New York, 1956, page 163.

Uses and Applications of Chemicals and Related Materials, Gregory, Reinhold Publ. Corp., New York, 1939, page 583.

LEON D. ROSDOL, *Primary Examiner.*

JULIUS GREENWALD, ALBERT T. MEYERS, SAMUEL H. BLECH, *Examiners.*

S. E. DARDEN, *Assistant Examiner.*